Patented May 31, 1949

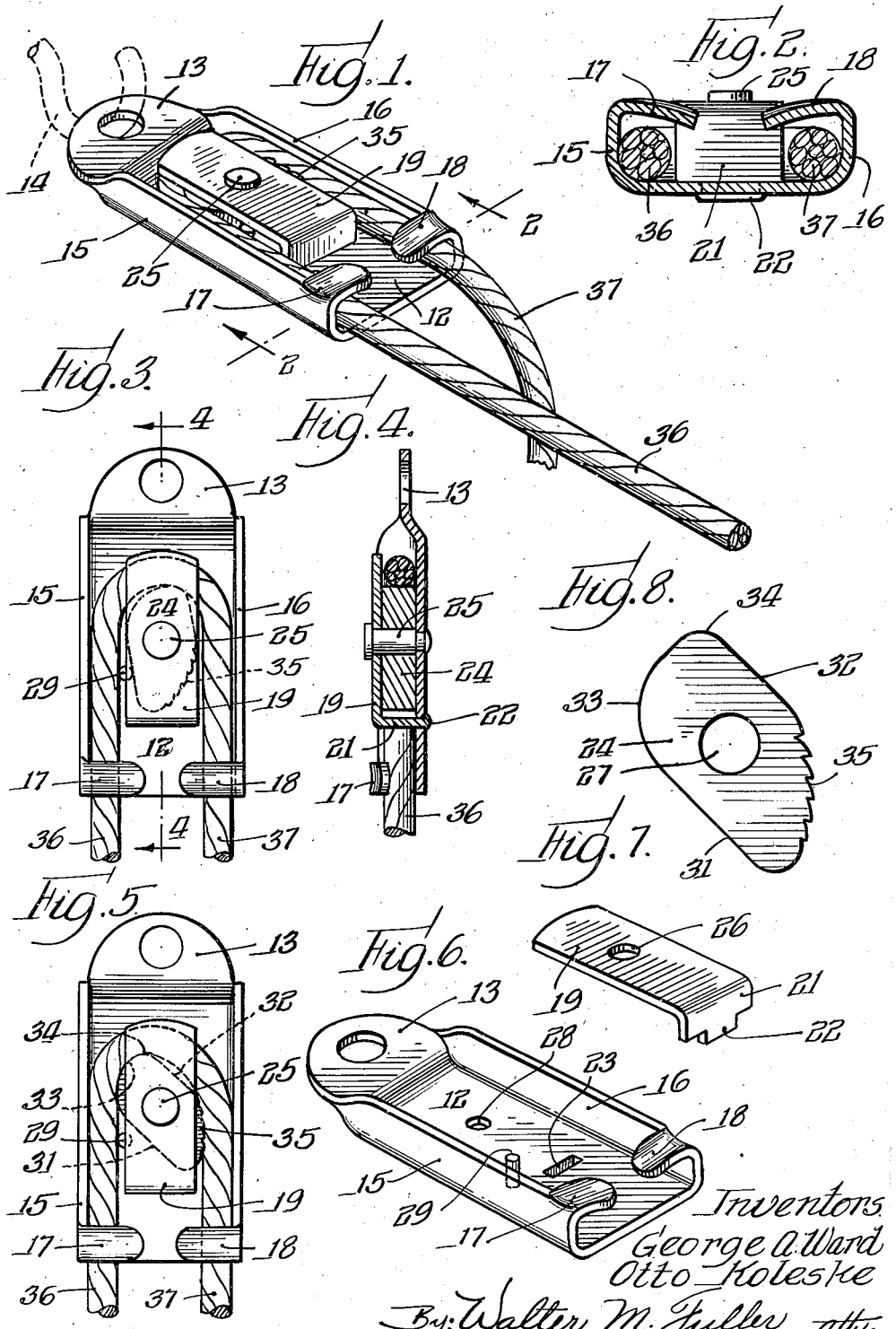

2,471,503

UNITED STATES PATENT OFFICE 2,471,503

ROPE HOLDER

George A. Ward and Otto Koleske, Springfield, Ill., assignors to Modern Machine Products Co., Springfield, Ill., a copartnership composed of George A. Ward and Otto Koleske Application February 27, 1946, Serial No. 650,446

1 Claim. (Cl. 24—134)

Our current invention relates to certain innovatory improvements, both structural and functional, in rope clamps or holders, such, for example, as clothes-line supports.

One outstanding object of the invention is to provide a clamp of this general type to which the rope may be easily and readily applied and then drawn taut and at the same time automatically securely clasped or grasped to maintain the rope under the applied strain.

Another aim of the invention is to supply such an appliance which is simple in structure and hence capable of manufacture economically.

A further design of the invention is to furnish the public with devices of this character which will not become damaged or broken while in ordinary service.

To the attainment of these and other desirable ends, we have invented an appliance of this style, a present embodiment of which has been illustrated in the accompanying drawing forming a part of this specification and to which reference should be had in connection with the following detailed description thereof.

For the sake of ease and simplicity, the same parts or elements of the device in the several views of the drawing have been supplied with like reference numerals.

In such drawing—

Figure 1 is a perspective view of the novel structure with a piece of rope clamped thereto;

Figure 2 is an enlarged cross-section on line 2—2 of Figure 1;

Figure 3 is a face view of the device with a piece of rope applied thereto but not clamped therein;

Figure 4 is a longitudinal section on line 4—4 of Figure 3;

Figure 5 is a face view of the structure, similar to that of Figure 3, with the rope tightly held therein;

Figure 6 shows the main body of the clamp in perspective;

Figure 7 presents another member of the structure in perspective; and

Figure 8 is a face view of the cam on an enlarged scale.

As is clearly portrayed in this drawing, the new type and style of clothesline-holder includes a main sheet-metal body having a substantially-rectangular back or bottom wall 12 terminating at one end in an elevated, rounded, apertured ear or lug 13, by means of which the whole clamp may be hung on and supported by a hook 14, or other suitable sustaining means, mounted on a post, wall or other appropriate body.

Along both opposite, lengthwise margins of the wall 12, and at right-angles thereto and integral therewith, are a pair of parallel, upstanding walls or flanges 15 and 16 which at one end may merge into the element 13, these flanges at their other ends having a pair of opposed or inwardly-directed lugs or ears 17 and 18 integral with the flanges at their upper parts and desirably curved transversely slightly, as presented perhaps most clearly in Figures 1, 2, 4 and 6.

A substantially-rectangular bar or plate 19 at one end has a downturned portion 21 terminating in a smaller or narrower extension 22 occupying and fitting in a transverse aperture 23 of corresponding shape and size through the wall 12, such parts being in some cases desirably, but not necessarily, welded or riveted together, so that the member 19 is above and parallel to wall 12, the space between them being occupied in part by an oscillatory cam 24 held in place by a round shouldered pin or stud 25 mounted in registered, cylindrical holes 26, 27 and 28, respectively, in the three overlying parts 19, 24 and 12, and about the axis of which pin the cam is designed to be oscillated by the rope to clamp the latter.

Securing pin 25, shouldered as illustrated in Figure 4, may be securely held in place to properly perform its functions by welding, riveting or by other appropriate means.

A stop-pin 29 mounted on and rising from the base or back wall 12 is in the path of rotation of cam 24 and limits its turning about its axis clockwise as the cam is viewed in Figure 3, so that it may not become improperly displaced.

Cam 24 has a pair of substantially parallel, opposite, edge surfaces 31 and 32 and at one end of these such edge surface 33 is of eccentric increasing radius to the outermost point 34, and the shape of the cam at its opposite end is similarly of increasing radius clockwise at 35 with somewhat-rounded marginal teeth, as is clearly illustrated.

The specified cam surface 33, 34 coacts with the rope and the latter with the inner surface of wall 15, whereas the eccentric toothed surface 35 cooperates with the rope and the inner face of wall 16.

Assuming that the novel holder or clamp has been mounted on the hook 14 and other convenient support by means by its perforated lug 13, a loop of the rope 36 near one end is readily applied inside of the holder beneath the tongues or projections 17 and 18, between the cam 24 and pin or post 29, on the one hand, and the wall 15 on the other hand, around the inner end of the cam beneath plate 19, and between the cam and the wall 16, as presented in Figure 3.

The operator then manually pulls lengthwise away from the holder on the free strand 37 of the rope to place the whole length of rope under appropriate strain and this is easily accomplished because such movement of the rope turns the cam by engagement therewith clockwise against the stop-pin 29 and provides adequate spaces between the two walls 15 and 16 and the two portions of the cam for the rope to slide easily in the holder.

As soon as the operator releases his pull slightly on the strand 37, the backward strain on the strand 36 causes the rope to turn a slight amount around the axis of pin 25 and carry the cam with it, whereby the rope is held from further relieving the applied strain by reason of the fact that such counter-clockwise rotation of the cam causes its toothed surface to grasp the rope and firmly hold it between itself and the wall 16, as is clearly depicted in Figure 5, the rounded surfaces of the teeth of the cam causing adequate engagement with the rope and without injury thereto.

When it is desired to disengage the rope from the holder or clamp, the free end 37 of the rope is again momentarily put under longitudinal strain greater than that on the other strand 36 thereby automatically rocking the cam clockwise by the rope and releasing the clamping action of the cam thereon, and, while in this condition, the operator manually or otherwise holds strand 36 to overcome or neutralize its strain and the rope is unlooped on the holder and, while this condition exists, removed therefrom.

Those acquainted with this art will, of course, readily understand that our invention is not necessarily limited and restricted to the precise and exact details of construction set forth and that reasonable modifications may be availed of without departure from the heart and essence of the invention, as defined by the appended claim, and without any substantial loss or sacrifice of its benefits and advantages.

Obviously, structures incorporating these principles of construction and action may be advantageously employed for more or less radically different purposes.

We claim:

A rope-holder incorporating in combination a first sheet-metal member having a flat bottom wall with a transverse slot and a separate aperture therethrough and a stationary abutment-pin upstanding from said bottom wall, and having erect from such wall and integral therewith a pair of marginal, parallel, longitudinal flanges with smooth inner surfaces spaced apart facing one another, the forward ends of the top portions of said flanges having a pair of opposed inwardly directed aligned spaced-apart ears integral with the flanges, the back ends of said flanges having appropriate means for the support of the ropeholder, a second member having a flat upper portion parallel with said bottom wall and apertured in register with the aperture of said first member, a stud occupying said apertures and at least in part supporting said second member, the forward end of said second member being bent down and having a tip positioned by and occupying said transverse slot, said second member being spaced from both of said flanges of a width to receive the rope to be secured, a cam between said first and second members oscillatory on said stud, said cam having a pair of substantially parallel opposite edge surfaces and at one end such edge surfaces being of eccentric increasing radius to the outermost point, the shape of such cam at its opposite end being similarly of increasing radius with somewhat rounded marginal teeth, the cam surface without teeth coacting with the rope and later with the inner surface of one of the flanges whereas the eccentric toothed surface of the cam cooperates with the rope and the inner face of the other flange, whereby a loop of the rope near one end thereof is applied inside of the holder beneath the ears between the cam and abutment-pin on the one hand and one of the flanges on the other hand around the inner end of the cam beneath said second member and between the cam and the other flange and then pulled lengthwise away from the holder on the free end of the rope strand to place the whole length of the rope under appropriate strain whereby such movement of the rope turns the cam by engagement therewith against the abutment-pin and provides adequate spaces between the two flanges and the two portions of the cam for the rope to slide easily in the holder, whereupon as soon as the operator releases his pull slightly on the rope the backward strain of the latter causes the rope to turn a slight amount around the axis of the abutment-pin and carry the cam with it whereby the rope is held from further relieving the applied strain by reason of the fact that the rotation of the cam causes its toothed surface to grasp the rope and firmly hold it between itself and the corresponding flange.

GEORGE A. WARD.
OTTO KOLESKE.

REFERENCES CITED

The following references are of record in the file of this patent:

UNITED STATES PATENTS

| Number | Name | Date |
|---|---|---|
| 895,590 | Sprague | Aug. 11, 1908 |
| 1,066,751 | Park | July 1, 1913 |
| 1,067,412 | Eckhardt et al. | July 15, 1913 |
| 1,320,691 | Holland | Nov. 4, 1919 |
| 1,456,712 | Podjus | May 29, 1923 |
| 1,962,964 | Morrison | June 12, 1934 |